June 17, 1969  W. R. MILLER, JR  3,450,156
HYDROSTATIC BEARING

Filed June 24, 1966  Sheet 1 of 2

INVENTOR.
WILLIAM R. MILLER
BY
ATTORNEY

United States Patent Office 3,450,156
Patented June 17, 1969

3,450,156
HYDROSTATIC BEARING
William R. Miller, Jr., Rochester, N.Y., assignor to Farrel Corporation, Rochester, N.Y., a corporation of Connecticut
Filed June 24, 1966, Ser. No. 560,327
Int. Cl. F16k 31/143
U.S. Cl. 137—509                         8 Claims

ABSTRACT OF THE DISCLOSURE

A hydrostatic bearing is provided for supporting the table of a vertical boring mill. Flow of oil to the bearing is controlled by a rectilinearly-reciprocable valve which has a wedge-shaped peripheral gash extending in the direction of reciprocation of the valve. The valve position controls supply of oil to the bearing. The valve is spring-pressed in one direction, and the pressure of the oil in the bearing is applied to move the valve in the opposite direction. Thus the load on the bearing determines the rate of flow of the oil to the bearing.

---

The present invention relates to hydrostatic bearings, and more particularly to hydrostatic bearings for supporting the tables of vertical boring mills, and the like. In a still more specific aspect, the invention relates to the control of a series of hydrostatic bearings arranged to act as segments of a complete bearing system used, for example, in supporting the table of a vertical boring mill.

It has become common practice in very large machine tools to float rotary worktables and reciprocating carriages on a film of oil. This is to reduce friction to a minimum, and also to improve the accuracy of the work being done.

When a single hydrostatic bearing is supplied from a constant displacement pump all the flow from the pump is delivered to the recess for the fluid in the bearing. The pump pressure will automatically rise to the pressure required to lift the bearing member initially to provide clearance for the flowing film of lubricant. However, should two or more bearings be supplied from the same pump, because of differences among the bearings, that is, such as load, geometry, etc., one is likely to lift before the others. If this occurs, the manifold pressure decreases and will be determined by the load on the lifted bearing in accordance with the pressure in the bearing created by the load. The entire output of the pump will then be discharged through the lifted bearing, and the other bearings will not lift.

In a vertical boring mill, it is desirable to maintain the film thickness at a constant value for variation of loads on the table and pressures in the bearing recess. When the film thickness is maintained at or near a constant value, large values of film thickness may be used without errors in the plane of rotation of the work surface of the table or of a surface being machined. The increase in usable film thickness reduces the power required to turn the table, and its work load on the bearing, reduces the heat thus generated, and the resultant distortions in the machine due to temperature change.

In bearings of this type, when the lubricant is assumed to have constant viscosity, the flow of lubricant through the bearing is proportional to the load on the bearing and to the cube of the film thickness. The pressure of the lubricant in the bearing recess is proportional to the load on the bearing. If the film thickness is to remain constant, the flow through the bearing must be increased proportionately to the increase in load on the bearing, or to the pressure in the bearing recess. If the lubricant is supplied from a constant pressure source, a control valve placed in the conduit from the source to the recess in the bearing must permit flow to the bearing recess to increase proportionately with the increase of pressure in the bearing recess, and permit the increase of flow with a proportionate decrease in the resistance to flow through the control valve.

To limit the flow to the first lifted bearing, various methods of compensation have been employed to allow the pump pressure to rise to the value necessary to lift the other bearings in the circuit.

One object of the present invention is to provide a hydrostatic bearing with which the film thickness between the moving parts of the bearing can be maintained at a constant value despite variation in loads on the table.

Another object of the invention is to provide a hydrostatic bearing in which the film thickness may be increased as compared with prior such bearings, thereby to reduce the power required to turn the table, the work load on the bearing, the heat generated, and the resultant distortions due to temperature change.

Other objects of the present invention are to provide hydrostatic bearings which will overcome the deficiencies of prior such bearings, and which will be very precise.

Still other objects of the invention will be apparent hereinafter from the specification and from the recital of the appended claims.

Figure 1:
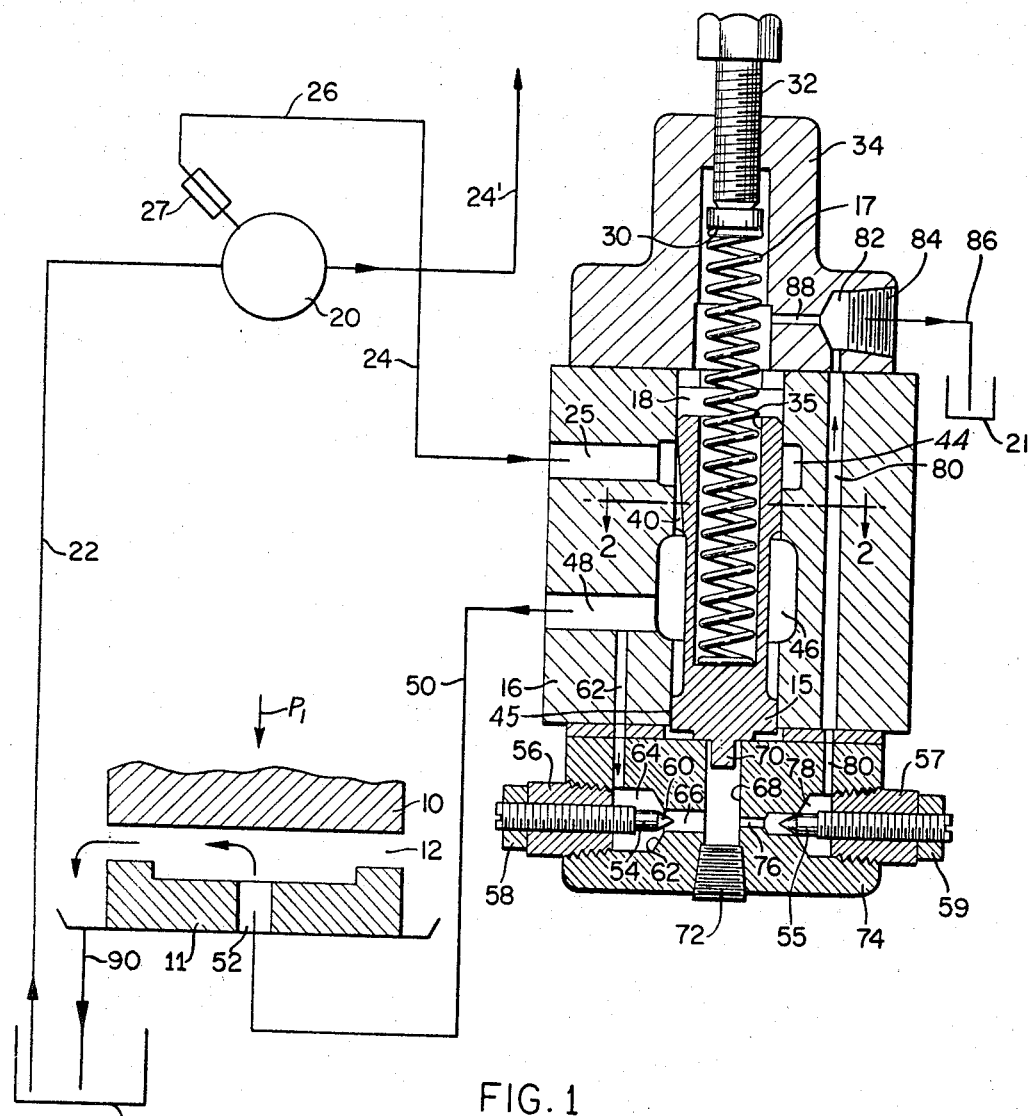
FIG. 1 is a view showing in axial section a control valve constructed according to one embodiment of this invention for controlling the flow of lubricant to a bearing for a rotary work table, reciprocable carriage, or the like, and also showing diagrammatically how this valve may be connected to a work table, a pump and a sump.
Figure 2:
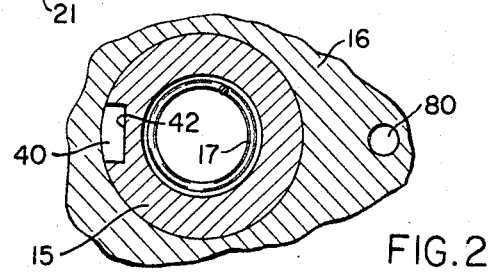
FIG. 2 is a fragmentary section on an enlarged scale taken on the line 2—2 of FIG. 1 looking in the direction of the arrows.

In the embodiment of the invention illustrated in the drawings, the flow of oil to the bearing is controlled by a rectilinearly reciprocable valve which has a wedge-shaped gash in its periphery connecting the oil supply duct with the line that leads to the bearing. The valve is spring-pressed in one direction and the pressure of the oil is applied to the valve to move it in the opposite direction. Thus, the pressure of oil in the bearing determines the position of the valve which in turn determines the rate of flow of the pressure oil to the bearing.

Referring now to the drawing by numerals of reference, 10 denotes the table or carriage of a machine, and 11 designates the bed on which the table rotates, or the carriage slides. An oil film 12 is maintained between the part 10 and the bed 11 to support the part 10 above the bed.

For maintaining substantially uniform thickness of film 12 between the part 10 and the bed 11 a reciprocable spool valve 15 is employed. This valve slides in a valve casing 16, and is constantly spring-pressed downward by a coil spring 17. Oil is supplied to the valve 15 from a variable volume pump 20, which is connected to the sump or reservoir in the machine by a line 22, and which is connected to the valve 15 by a check valve 27, a line 24, and the port or duct 25 in the valve casing 16. Lines similar to line 24, of which only one is shown at 24', connect the pump with other valves of the system.

The spring 17 seats at its upper end against the inner face 30 of a tension-adjusting screw 32 which threads into the head 34 of the housing 16. The valve 15 itself is formed with a hollow chamber 35; and the lower end of the spring 17 seats against the bottom face of this chamber.

The valve spool 15 has a wedge-shaped notch or slot 40 in it which increases in depth downwardly, and which has a plane chordal inside wall 42.

In normal position, the upper edge of the groove or slot 40 registers with the annular groove 44 in the casing 16 with which the supply duct or port 25 communicates.

The spool is guided at its upper end on the wall of the cylindrical chamber 18 in which it reciprocates, and is formed adjacent its lower end with an enlarged diameter guide portion 45 which engages against this same wall.

Oil under pressure flows from the supply duct or port 25 through the annular recess 44 into the narrow upper edge of the groove 40 and through the groove 40 into the annular chamber 46 formed in the valve case housing. This chamber communicates with the port or duct 48 which is connected by duct 50 and the port 52 in the bed 11 with the space 12 between the bed and the table or carriage.

Duct 48 is also connected by a duct 62 with a chamber 64 formed in a cap 74 that is fastened in any suitable manner to the lower end of casing 16.

The maximum bearing pressure under table or carriage 10 is adjusted by setting of two needle valves 54 and 55. The needle valve 54 threads into a nut 56 which in turn threads into cap 74. A lock nut 58 serves to secure the needle valve 54 in any adjusted position. The needle valve 55 threads into a nut 57 which in turn threads into the valve housing 16. Needle valve 55 is secured in any adjusted position by lock nut 59.

Needle valve 54 has a conical inner end 60 which is adapted to control the area of the opening between the chamber 64, in which the needle valve 54 is adjustable, and a duct 66 which connects this chamber with a cylinder 68 in cap 74. The hydrostatic oil flows from duct 48 through duct 62 into chamber 64 and through the opening, which is controlled by needle valve 54, and duct 66 into cylinder 68.

The lower end of the spool valve 15 is formed with a protrusion 70 which engages and enters into cylinder 68 and operates as a piston so that oil pressure on protrusion 70 tends to move the spool valve upwardly against the resistance of spring 17. Cylinder 68 is closed at its lower end by a plug 72 which threads into cap 74. A duct 76 of much smaller diameter than duct 66 communicates with cylinder 68; and the flow rate through the duct 76 into the chamber 78 of valve 55 is controlled by the setting of this valve.

From chamber 78 the fluid flows through a duct 80 into a recess 82 in the valve casing which is connected through an opening in the plug 84 with a duct 86 that leads back to the sump 21. Leakage of fluid past valve 15 itself drains off through duct 88, plug 84 and line 86 back to the sump.

The oil flows from the space 12 back to the sump through the line 90.

In normal position, the upper narrow edge of the groove or slot 40 registers with the supply duct 25 and oil under pressure passes through this narrow edge into chamber 46 and is then carried through ducts 48, 50 and 52 to the space 12. When pressure, such as the pressure of cutting, increases on the table or carriage 10, as denoted at $P_1$, there is a tendency for the oil to be squeezed out from between the parts 10 and 12 and to flow through the duct 90 back to the sump 21. At the same time the oil flows through duct 62, chamber 64, needle valve 54, and duct 66 into cylinder 68, forcing the spool valve 15 upwardly against the resistance of spring 17. This causes a larger area of the wedge-shaped groove 40 to register with the supply duct 25, thereby supplying an increased amount of oil to duct 50 and through this duct and the duct 52 into the space 12. Thus, an increase of the table or carriage load is compensated for; and an optimum thickness of oil film is maintained between the table or carriage and the bed as desired.

When the lubricant is assumed to have constant viscosity, as previously stated, the flow of the lubricant through the bearing is proportional to the load on the bearing and to the cube of the film thickness. The pressure of the lubricant in the bearing recess is proportional to the load on the bearing. If the film thickness is to remain constant, the flow through the bearing must be increased proportionately to the increase in load on the bearing or the pressure in the bearing recess. If the lubricant is supplied from a constant pressure source, the control valve 15 must permit flow to the bearing recess to increase proportionately with the increase of pressure in the bearing recess, and permit the increase of flow with a proportionate decrease in resistance to flow through the control valve.

The displacement of the spool 15 from its initial position is linearly proportional to the change in the pressure in the bearing recess. The body of the spool prevents flow of lubricant from the valve body chamber 44 connected to the pump to the body chamber 46 connected to the bearing recess except for the flow permitted by the gash in the spool. As the spool is moved by the increase of pressure in the bearing recess, the area of the orifice formed by the edge of the bore 18 in the valve housing and the gash 40 in the spool increases as a result of the angle of the gash surface. The gash 40 is a plane surface ground at an angle to the axis of the spool cylinder. The depth of the gash at the orifice section is linearly proportional to the movement of the spool; but the area of the orifice section increases non-linearly with the movement of the spool. The non-linear gain in the orifice area provides the required characteristic of the control valve that the pressure drop in the valve decrease with the increase of flow through the valve in response to the increase in pressure in the bearing recess 12.

Since the flow Q at a given time is proportional to the bearing recess pressure P' and through the valve is proportional to the area A of the orifice at the given time, and the square root of the difference in the pressure at the source P and in the bearing recess P', the area of the orifice A is proportional to the bearing recess pressure P' and inversely proportional to the square root of the pressure differential across the valve $(P-P')$.

Figure 3:
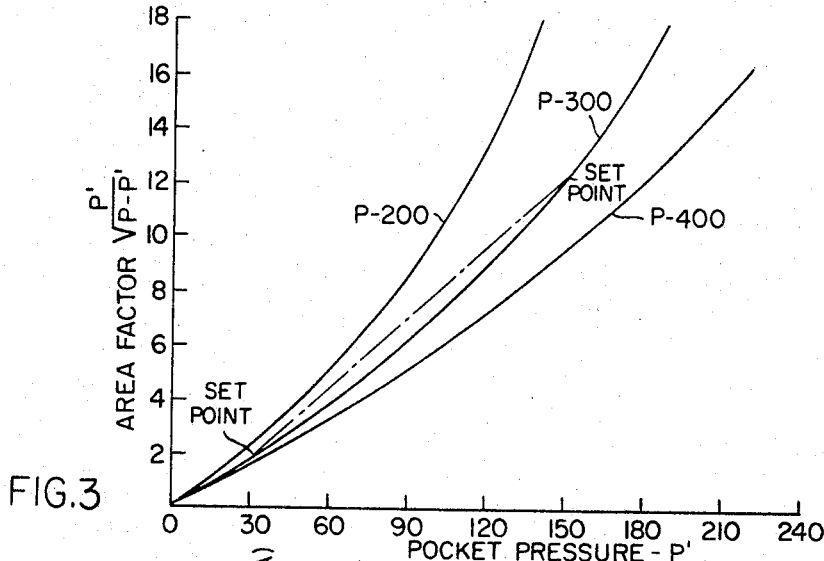
FIGS. 3 to 5 inclusive are diagrams showing the relation of various factors that influence the design of the control valve.

The graph in FIG. 3 illustrates the relative values of the orifice area A and of the bearing recess pressure P' for several values of source pressure P. The area of the orifice A depends on the diameter of the spool body and the depth of the gash at that point on the spool corresponding with the edge of the bore 18 in the valve body 15. If the area of the orifice A is expressed in terms of the full cross-sectional area of the spool cylinder, and the depth of the gash in terms of the radius of the spool cylinder, then the relationship of the depth of the gash and the orifice area A may be calculated for any diameter of spool cylinder.

The flow through the bearing for the minimum and for the maximum bearing recess pressure can be determined by calculation or test. The orifice area required for each of these flow conditions with a given source can be computed. The depth of gash in a given diameter of spool cylinder for each of the orifice areas can be determined.

Figure 4:
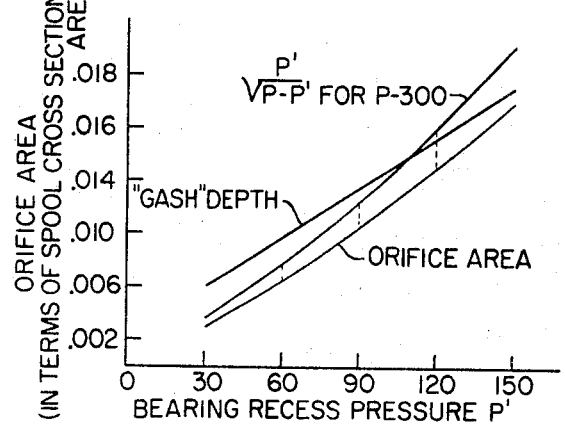

The difference in the depth of the gashes and the travel of the spool cylinder between the points at which these depths are to be effective, determine the angle the gash surface shall make with the axis of the spool cylinder, as shown in FIG. 4. Then the area of the orifice is correct for two set points in the spool travel, minimum and maximum flow conditions. The correctness of the orifice area at a point intermediate the set points is checked with the procedure in FIG. 5. Assume that the bearing recess pressure will range from 30 p.s.i. to 150 p.s.i. and 3000 p.s.i. source pressure will be used. From the graph of FIG. 3, the orifice area required for 30 p.s.i. bearing pressure is 1.8 $K_2$ and for 150 p.s.i. bearing recess pressure is 12.1 $K_2$. An orifice area 1.8 $K_2$ will be assumed equal to .003 of the cylindrical cross-sectional area of the spool to be used. The orifice area of 12.1 $K_2$ will then correspond to .0201 of the cross-sectional area of the spool.

Figure 5:
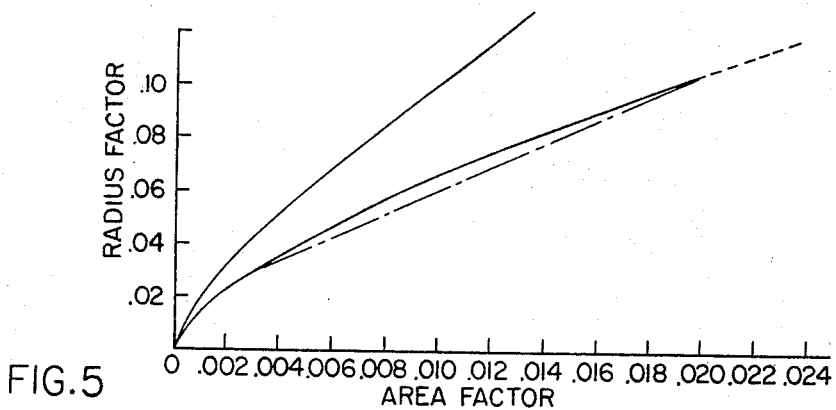

From diagram of FIG. 5 the depth of the gash for an orifice area of 1.8 $K_2$ and .003 of the spool area is .03 of the spool radius; for an orifice area of 12.1 $K_2$ and .0201 of the spool area the gash depth is .105 of the spool radius. For a bearing recess pressure of 90 p.s.i., the spool will be moved midway between the set points of 30 and 150 p.s.i., and the depth of the gash will be midway between the depths of the set points or .0675 of the spool radius. The orifice area at this point will be .0102 of the spool area or 6.12 $K_2$ in the area scale. From FIG. 3 the required orifice area for 90 p.s.i. bearing recess pressure is 6.12 $K_2$. This check indicates the exact correspondence of the area of the orifice required for the flow and of the orifice area provided by the gash.

The source pressure should be selected 100 p.s.i. greater than the maximum bearing recess pressure to be used. The bearing recess pressure may be permitted to range by 10 to 1. The minimum gash depth should be approximately 0.10 inch per inch of spool diameter.

The use of simple plane surface gashes on the spool, formed in an inexpensive operation of manufacture to the exact and predetermined geometry required for various conditions of application to control the flow from a single pressure source to the section of a hydrostatic bearing for the table of a vertical boring mill, thereby securing a relatively simple valve with a single moving element for quick and precise response to signal, is novel.

In valve 15, one spool is used. The spool strokes with equal changes in position in response to equal changes in the bearing recess pressure. The change in resistance to the flow of oil to the bearing is not equal for equal changes of position of this spool. The resistance to flow changes exponentially in respect to the travel of the spool. In valve 15, one spool accomplishes the function of changing the resistance of flow exponentially in respect to changes in bearing recess pressure.

Having thus described my invention, what I claim is:

1. A system for supplying hydraulic pressure fluid to a hydrostatic bearing comprising
   a supply line for the pressure fluid,
   a duct connected for delivering the pressure fluid to the bearing,
   a control valve positioned to control the amount of fluid flowing from said supply line to said duct and movable to vary the flow, and
   means for applying the pressure fluid to said valve to move said valve,
   said valve having therein a slot of progressively varying area in the direction of movement of the valve, and
   this slot connecting said supply line with said duct.

2. A system as claimed in claim 1, wherein the valve is reciprocable rectilinearly in a valve housing, the slot is in the periphery of the valve and extends in the direction of movement of the valve and is of progressively varying area in that direction, the depth of the slot is linearly proportional to the movement of the valve, but the area of the orifice formed at the juncture of the slot and the supply line changes non-linearly with the movement of the valve.

3. A system for supplying hydraulic pressure fluid to a hydrostatic bearing comprising
   a supply line for the pressure fluid,
   a duct connected for delivering the pressure fluid to the bearing,
   a control valve positioned to control the amount of fluid flowing from said supply line to said duct and movable to vary the flow, and
   means for applying the pressure fluid to said valve to move said valve,
   said valve being a spool valve and being reciprocable rectilinearly in a bore in a valve housing,
   said supply line and said duct communicating with said bore and being spaced from one another in the direction of movement of said valve,
   said valve having a slot in its periphery extending in the direction of movement of the valve and varying in depth in said direction and constituting the connection between said supply line and said duct,
   a spring mounted to move said valve one way in said direction, and
   a conduit for applying pressure fluid from said duct to said valve to move said valve against said spring in said direction.

4. A system as claimed in claim 3, wherein said slot has plane sides and a plane bottom and is of wedge-shape in said direction.

5. A system as claimed in claim 3, wherein said spool valve has an extension at one end reciprocable in a cylinder formed in said housing, and said conduit supplies the pressure fluid to said cylinder to move said valve against the resistance of said spring.

6. A system as claimed in claim 5, wherein means is provided for adjusting the rate of flow of the fluid from said conduit to said cylinder.

7. A system as claimed in claim 6, wherein said adjusting means comprises a needle valve adjustable in said conduit to control the area of the orifice between said conduit and said cylinder.

8. A system as claimed in claim 7, wherein an exhaust conduit is connected to said cylinder, and a second adjustable needle valve controls the area of the orifice between said cylinder and said exhaust conduit to throttle flow of fluid from said cylinder.

References Cited

UNITED STATES PATENTS

| 2,410,375 | 10/1946 | Wright | 137—509 |
| 2,788,862 | 4/1957 | Langer | 308—122 |
| 2,938,756 | 5/1960 | Loeb | 308—122 |
| 3,029,111 | 4/1962 | Love | 308—122 |
| 3,113,808 | 12/1963 | Carroll | 308—122 |

ROBERT J. MILLER, *Primary Examiner.*

U.S. Cl. X.R.

251—205